Sept. 15, 1942.　　　　J. NULL　　　　2,295,964
WATERING APPARATUS
Filed March 18, 1940
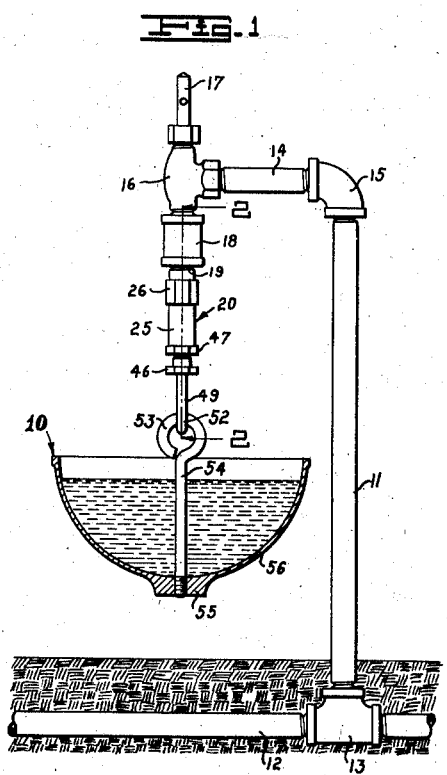
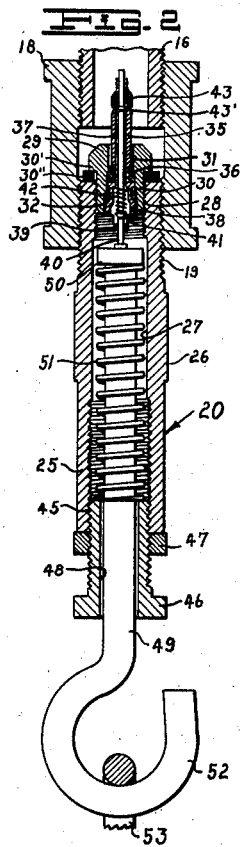
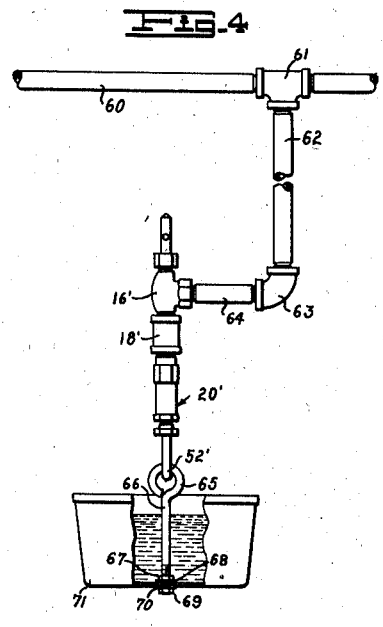
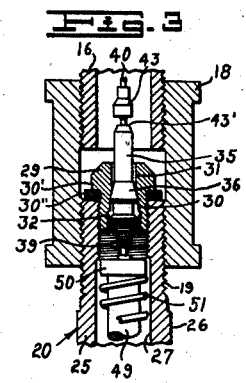
INVENTOR.
JESSE NULL
BY
ATTORNEY.

Patented Sept. 15, 1942

2,295,964

UNITED STATES PATENT OFFICE 2,295,964

WATERING APPARATUS

Jesse Null, Arcadia, Calif.

Application March 18, 1940, Serial No. 324,591

1 Claim. (Cl. 119—81)

This invention relates to watering apparatus.

The general object of this invention is to provide a poultry and live stock watering apparatus including a novel automatically controlled valve.

Another object of the invention is to provide a poultry and live stock watering apparatus including novel flow adjusting means.

Another object of the invention is to provide a water apparatus including a novel drinking bowl.

A further object of the invention is to provide novel means for connecting a watering apparatus to a suitable supply of water.

Other objects and the advantages of this invention will be apparent from the following description taken in connection with the accompanying drawing, wherein:

Fig. 1 is a side elevation, with parts in section, showing a poultry and live stock watering apparatus embodying the features of my invention;

Fig. 2 is an enlarged fragmentary section taken on line 2—2, Fig. 1;

Fig. 3 is a fragmentary sectional view similar to Fig. 2 showing the parts in another position; and Fig. 4 is a side elevation, partly in section, showing a modification of my invention.

Referring to the drawing by reference characters I have shown my invention as embodied in a poultry and live stock watering apparatus which is indicated generally at 10.

As shown the poultry and live stock watering apparatus is mounted on a vertical conduit 11 which has its lower end connected to a suitable water supply conduit 12 by a T 13 and has its upper end connected to one end of a horizontal conduit 14 by an elbow 15. The other end of the conduit 14 is connected to a valve 16 which includes a valve stem 17 by means of which the flow of water may be regulated.

A coupling member 18 has its upper end connected to the valve 16. The lower end of the member 18 threadedly receives the threaded portion 19 of an automatic valve indicated generally 20 (see Fig. 2).

The automatic valve 20 includes a body 25 having an integral hexagonal portion 26 having a central bore 27 therethrough. The bore 27 includes a reduced internally threaded portion 28 at the upper end thereof (Fig. 2). The threaded portion 28 receives a stud bolt 29 provided with a tapering valve seat forming bore 30. The bolt 29 includes a flange 30' which engages a washer 30'' to provide a leak-proof joint. The bore 30 communicates with an upper bore 31 and with an internally threaded lower portion 32.

The threaded portion 32 threadedly engages a valve housing 35 provided with a resilient washer 36 which seats against the valve seat forming bore 30. The housing includes a central bore 37 having an enlarged lower bore 38 with a saddle portion 39 therebelow. A rod 40 is slidably mounted in the saddle portion 39 and extends upwardly through the bore 37 to a predetermined distance above the valve housing 35. The rod is provided with a shoulder 41 which engages the lower end of a compression spring 42. The upper end of the spring reacts against the shoulder provided by the enlarged portion 38 in the bore 37 to normally urge the rod 40 downwardly.

Downward movement of the rod 40 is checked by a resilient valve 43 which seats against a valve seat 43' formed on the upper end of the housing 35. The valve 43 is suitably secured to the rod 40.

The lower end of the bore 27 in the body 25 is threaded as at 45 to receive a stud bolt 46 having a central bore 48 therethrough. A lock nut 47 is arranged on the bolt 46. A rod 49 is positioned in the bore 48 and is provided with a head portion 50 within the bore 27 which is normally urged into engagement with the lower end of the rod 40 by a compression spring 51 mounted on the rod 49 and which reacts against the stud 46 and the head portion 50. The compression spring 51 is comparatively stronger than the compression spring 42.

The rod 49 extends downwardly from the stud 46 and includes an open eye 52 which engages an eyelet 53 of a rod 54 which is threadedly, or otherwise, secured to a boss portion 55 of a bowl 56 which is shown as semi-spherical.

In operation the poultry and live stock watering apparatus is connected to a suitable water supply as shown in Fig. 1, and the bowl 56 is filled with water to a predetermined depth. The stud 46 is adjusted so that when the bowl 56 is full water will very slowly drip into the bowl. The lock nut 47 is then tightened to hold the parts in adjusted position.

As the water is removed from the bowl 56 weight is removed from the spring 51 thus allowing the rod 49 to be moved upwardly by the spring 51. This in turn moves the rod 40 upwardly to lift the valve 43 from its seat on the housing 35 (see Fig. 3). Water is then allowed to flow through the valve housing 35, over the saddle portion 39, through the bore 27 in the housing 25, through the bore 48 in the stud 46 and thus downwardly into the bowl to replenish the supply thus maintaining it at the desired level.

In Fig. 4 I have shown a modification of my invention wherein the water is supplied from a suitable overhead supply conduit 60 which is connected to a valve 16' by a T 61, a conduit 62, an elbow 63, and horizontal conduit 64.

The valve 16' is connected by a coupling 18' to a valve 20' which is similar in all respects to the valve 20 and includes an open eyelet 52' which supports an eye 65 on a shaft 66. The lower end of the shaft 66 is threaded to receive a nut 67 and washer 68. A second nut 69 and washer 70 secure a receptacle 71 thereon.

The operation of the modification shown in Fig. 4 is the same as that of the construction shown in Fig. 1.

From the foregoing description it will be apparent that I have provided a poultry and live stock watering apparatus which can be economically manufactured and which is highly efficient for its intended purpose.

Having thus described my invention, I claim:

In a poultry and livestock watering device, a supporting conduit, an elongated hollow tube supported at the upper end thereof on said conduit, said tube communicating with said conduit, a stud bolt having a bore therethrough and threadedly engaging the upper end of said tube, a valve secured in said stud bolt bore, said stud bolt having a flange thereon, a gasket engaging said stud bolt flange and the upper end of said hollow tube, said valve having a valve rod extending into said tube, a second stud bolt having a bore therethrough and threadedly engaging the lower end of said tube, said two stud bolt bores being axially aligned, an operating rod slidable through said second stud bolt bore and extending upwardly into the interior of said tube, said operating rod having a diameter less than the diameter of the tube and less than the diameter of the bore of the second stud bolt, said operating rod having an enlarged head portion at the upper end thereof adapted to engage said valve rod, a compression spring disposed about said operating rod in said tube, said spring at the upper end thereof engaging said head portion and at the lower end thereof engaging said second stud bolt, and a receptacle supported by said operating rod and normally urging said head portion away from said valve rod.

JESSE NULL.